United States Patent
Spahl et al.

(10) Patent No.: US 9,925,843 B2
(45) Date of Patent: Mar. 27, 2018

(54) REAR SUSPENSION SYSTEMS FOR LATERALLY TILTABLE MULTITRACK VEHICLES

(71) Applicant: FORD GLOBAL TECHNOLOGIES, LLC, Dearborn, MI (US)

(72) Inventors: Robert Spahl, Köln (DE); Marc Simon, Köln (DE); Edmund Halfmann, Neuss (DE); Thomas Gerhards, Niederzier (DE); Rainer Souschek, Juelich (DE); Ralf Hintzen, Aachen (DE); Daniel Mainz, Herzogenrath (DE); Martin Saeger, Pulheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/630,070

(22) Filed: Feb. 24, 2015

(65) Prior Publication Data
US 2016/0243918 A1    Aug. 25, 2016

(51) Int. Cl.
*B60G 21/05*    (2006.01)

(52) U.S. Cl.
CPC .......... *B60G 21/05* (2013.01); *B60G 2204/62* (2013.01); *B60G 2204/8304* (2013.01); *B60G 2300/13* (2013.01); *B60G 2300/45* (2013.01)

(58) Field of Classification Search
CPC ........ B60G 21/05; B60G 21/055; B60G 9/02; B60G 9/027; B60G 2800/012; B60G 2800/0124

USPC ........ 280/5.506, 5.509, 47.131, 47.16, 47.15
See application file for complete search history.

(56) References Cited

U.S. PATENT DOCUMENTS

| | | |
|---|---|---|
| 2,186,065 A | 1/1940 | Fischer |
| 2,353,503 A | 7/1944 | Rost et al. |
| 2,474,471 A | 6/1949 | Dolan |
| 3,309,097 A | 3/1967 | Fritz |
| 3,417,985 A | 12/1968 | Hannan |
| 3,558,123 A | 1/1971 | Yew |
| 3,572,456 A | 3/1971 | Healy |

(Continued)

FOREIGN PATENT DOCUMENTS

| | | |
|---|---|---|
| CN | 1918013 A | 2/2007 |
| DE | 679966 C | 8/1939 |

(Continued)

OTHER PUBLICATIONS

Office Action dated Nov. 28, 2014 for patented U.S. Appl. No. 14/201,550.

(Continued)

*Primary Examiner* — Barry Gooden, Jr.
(74) *Attorney, Agent, or Firm* — Jones Robb, PLLC; Raymond Coppiellie

(57) ABSTRACT

A rear suspension system for a laterally tiltable, multitrack vehicle may include first and second trailing arms. The rear suspension system may further include first and second balancer systems acting between the first and second trailing arms. The first balancer system may create a torque to influence a leaning angle of the vehicle when the suspension system is in use. The second balancer system may suppress a resonant vertical motion of the vehicle when the suspension system is in use.

25 Claims, 7 Drawing Sheets

(56) References Cited

U.S. PATENT DOCUMENTS

| | | | |
|---|---|---|---|
| 3,589,700 A * | 6/1971 | Ruet | B60G 11/32 |
| | | | 267/221 |
| 3,733,087 A * | 5/1973 | Allison | B60G 7/001 |
| | | | 267/276 |
| 3,990,725 A * | 11/1976 | Allison | B60G 7/001 |
| | | | 267/188 |
| 3,992,036 A * | 11/1976 | Allison | B60G 7/001 |
| | | | 280/124.137 |
| 4,273,357 A * | 6/1981 | Pashkow | B60G 9/003 |
| | | | 280/124.116 |
| 4,351,410 A | 9/1982 | Townsend | |
| 4,375,293 A | 3/1983 | Solbes | |
| 4,458,918 A * | 7/1984 | Rumpel | B60G 3/202 |
| | | | 267/262 |
| 4,614,359 A * | 9/1986 | Lundin | B60G 3/205 |
| | | | 267/246 |
| 4,632,413 A | 12/1986 | Fujita et al. | |
| 4,657,271 A | 4/1987 | Salmon | |
| 4,659,106 A | 4/1987 | Fujita et al. | |
| 4,685,690 A | 8/1987 | Fujita et al. | |
| 4,779,893 A * | 10/1988 | Juechter | B60G 11/08 |
| | | | 280/124.143 |
| 4,887,829 A | 12/1989 | Prince | |
| 5,040,812 A | 8/1991 | Patin | |
| 5,040,823 A | 8/1991 | Lund | |
| 5,069,476 A | 12/1991 | Tsutsumi et al. | |
| 5,116,069 A | 5/1992 | Miller | |
| 5,161,425 A | 11/1992 | Baskett et al. | |
| 5,161,822 A | 11/1992 | Lund | |
| 5,207,451 A | 5/1993 | Furuse et al. | |
| 5,324,056 A | 6/1994 | Orton | |
| 5,337,847 A | 8/1994 | Woods et al. | |
| 5,347,457 A | 9/1994 | Tanaka et al. | |
| 5,445,443 A | 8/1995 | Hauser et al. | |
| 5,580,089 A | 12/1996 | Kolka | |
| 5,611,555 A | 3/1997 | Vidal | |
| 5,762,351 A | 6/1998 | Soohoo | |
| 5,765,115 A | 6/1998 | Ivan | |
| 5,765,846 A | 6/1998 | Braun | |
| 5,772,224 A | 6/1998 | Tong | |
| 5,791,425 A | 8/1998 | Kamen et al. | |
| 5,825,284 A | 10/1998 | Dunwoody et al. | |
| 5,839,082 A | 11/1998 | Iwasaki | |
| 5,927,424 A | 7/1999 | Van Den Brink et al. | |
| 6,026,920 A | 2/2000 | Obeda et al. | |
| 6,116,618 A | 9/2000 | Shono et al. | |
| 6,142,494 A | 11/2000 | Higuchi | |
| 6,149,226 A | 11/2000 | Hoelzel | |
| 6,213,561 B1 | 4/2001 | Witthaus | |
| 6,250,649 B1 | 6/2001 | Braun | |
| 6,311,795 B1 | 11/2001 | Skotnikov | |
| 6,328,125 B1 | 12/2001 | Van Den Brink et al. | |
| 6,367,824 B1 | 4/2002 | Hayashi | |
| 6,390,505 B1 | 5/2002 | Wilson | |
| 6,425,585 B1 | 7/2002 | Schuekle et al. | |
| 6,435,522 B1 | 8/2002 | Van Den Brink et al. | |
| 6,446,980 B1 | 9/2002 | Kutscher et al. | |
| 6,454,035 B1 | 9/2002 | Waskow et al. | |
| 6,460,835 B1 | 10/2002 | Hamano et al. | |
| 6,467,783 B1 | 10/2002 | Blondelet et al. | |
| 6,511,078 B2 | 1/2003 | Sebe | |
| 6,554,293 B1 | 4/2003 | Fennel et al. | |
| 6,564,129 B2 | 5/2003 | Badenoch | |
| 6,637,758 B2 | 10/2003 | Woo | |
| 6,654,674 B2 | 11/2003 | Lu et al. | |
| 6,697,726 B2 | 2/2004 | Takagi et al. | |
| 6,702,265 B1 * | 3/2004 | Zapletal | B60G 5/00 |
| | | | 267/187 |
| 6,722,676 B2 | 4/2004 | Zadok | |
| 6,725,135 B2 | 4/2004 | McKeown et al. | |
| 6,805,362 B1 | 10/2004 | Melcher | |
| 6,817,617 B2 | 11/2004 | Hayashi | |
| 7,066,474 B2 | 6/2006 | Hiebert et al. | |
| 7,073,806 B2 | 7/2006 | Bagnoli | |
| 7,097,187 B2 | 8/2006 | Walters et al. | |
| 7,131,650 B2 | 11/2006 | Melcher | |
| 7,229,086 B1 | 6/2007 | Rogers | |
| 7,343,997 B1 * | 3/2008 | Matthies | B60G 21/007 |
| | | | 180/215 |
| 7,389,592 B2 | 6/2008 | Tsuruta et al. | |
| 7,487,985 B1 | 2/2009 | Mighell | |
| 7,568,541 B2 | 8/2009 | Pfeil et al. | |
| 7,571,787 B2 * | 8/2009 | Saiki | B60G 7/00 |
| | | | 180/210 |
| 7,591,337 B2 | 9/2009 | Suhre et al. | |
| 7,607,695 B2 | 10/2009 | Moulene | |
| 7,631,721 B2 | 12/2009 | Hobbs | |
| 7,640,086 B2 | 12/2009 | Nakashima et al. | |
| 7,641,207 B2 | 1/2010 | Yang | |
| 7,648,148 B1 | 1/2010 | Mercier | |
| 7,665,742 B2 | 2/2010 | Haerr et al. | |
| 7,673,883 B2 | 3/2010 | Damm | |
| 7,731,210 B2 * | 6/2010 | Pedersen | B60G 21/007 |
| | | | 180/209 |
| 7,887,070 B2 | 2/2011 | Kirchner | |
| 7,896,360 B2 | 3/2011 | Buma | |
| 7,914,020 B2 | 3/2011 | Boston | |
| 7,946,596 B2 | 5/2011 | Hsu et al. | |
| 7,967,306 B2 | 6/2011 | Mighell | |
| 8,016,302 B1 | 9/2011 | Reeve | |
| 8,050,820 B2 | 11/2011 | Yanaka et al. | |
| 8,070,172 B1 | 12/2011 | Smith et al. | |
| 8,104,781 B2 | 1/2012 | Gazarek | |
| 8,260,504 B2 | 9/2012 | Tsujii et al. | |
| 8,262,111 B2 | 9/2012 | Lucas | |
| 8,345,096 B2 | 1/2013 | Ishiyama et al. | |
| 8,641,064 B2 | 2/2014 | Krajekian | |
| 8,651,503 B2 | 2/2014 | Rhodig | |
| 8,818,700 B2 | 8/2014 | Moulene et al. | |
| 8,925,940 B2 | 1/2015 | Michell | |
| 9,045,015 B2 | 6/2015 | Spahl et al. | |
| 9,090,281 B2 | 7/2015 | Spahl et al. | |
| 9,145,168 B2 | 9/2015 | Spahl et al. | |
| 9,216,763 B2 * | 12/2015 | Huntzinger | B60G 3/08 |
| 9,248,857 B2 | 2/2016 | Spahl et al. | |
| 9,283,989 B2 | 3/2016 | Spahl et al. | |
| 9,296,420 B2 | 3/2016 | Sasaki et al. | |
| 9,493,208 B2 | 11/2016 | Sasaki et al. | |
| 2001/0028154 A1 | 10/2001 | Sebe | |
| 2002/0109310 A1 | 8/2002 | Lim et al. | |
| 2002/0171216 A1 | 11/2002 | Deal | |
| 2002/0190494 A1 | 12/2002 | Cocco | |
| 2003/0071430 A1 | 4/2003 | Serra et al. | |
| 2003/0102176 A1 | 6/2003 | Bautista | |
| 2003/0141689 A1 | 7/2003 | Hamy | |
| 2003/0197337 A1 | 10/2003 | Dodd et al. | |
| 2004/0051262 A1 | 3/2004 | Young | |
| 2004/0100059 A1 | 5/2004 | Van Den Brink | |
| 2004/0134302 A1 | 7/2004 | Ko et al. | |
| 2004/0199314 A1 | 10/2004 | Meyers et al. | |
| 2004/0236486 A1 | 11/2004 | Krause et al. | |
| 2005/0051976 A1 | 3/2005 | Blondelet et al. | |
| 2005/0082771 A1 | 4/2005 | Oh | |
| 2005/0127656 A1 | 6/2005 | Sato et al. | |
| 2005/0184476 A1 | 8/2005 | Hamm | |
| 2005/0199087 A1 | 9/2005 | Li et al. | |
| 2005/0206101 A1 | 9/2005 | Bouton | |
| 2005/0275181 A1 | 12/2005 | Macisaac | |
| 2006/0049599 A1 | 3/2006 | Lehane | |
| 2006/0091636 A1 | 5/2006 | Shelton | |
| 2006/0151982 A1 | 7/2006 | Mills | |
| 2006/0170171 A1 | 8/2006 | Pedersen | |
| 2006/0180372 A1 | 8/2006 | Mercier et al. | |
| 2006/0220331 A1 | 10/2006 | Schafer et al. | |
| 2006/0226611 A1 | 10/2006 | Xiao et al. | |
| 2006/0249919 A1 | 11/2006 | Suzuki et al. | |
| 2006/0276944 A1 | 12/2006 | Yasui et al. | |
| 2007/0029751 A1 | 2/2007 | Marcacci | |
| 2007/0075517 A1 | 4/2007 | Suhre et al. | |
| 2007/0078581 A1 | 4/2007 | Nenninger et al. | |
| 2007/0126199 A1 | 6/2007 | Peng et al. | |
| 2007/0151780 A1 | 7/2007 | Tonoli et al. | |
| 2007/0182110 A1 | 8/2007 | Urababa | |

(56) References Cited

U.S. PATENT DOCUMENTS

| | | | |
|---|---|---|---|
| 2007/0182120 A1 | 8/2007 | Tonoli et al. | |
| 2007/0193803 A1 | 8/2007 | Geiser | |
| 2007/0193815 A1 | 8/2007 | Hobbs | |
| 2007/0228675 A1 | 10/2007 | Tonoli et al. | |
| 2007/0241522 A1 | 10/2007 | Tsai | |
| 2008/0001377 A1* | 1/2008 | Rogic | B60G 3/14 280/124.125 |
| 2008/0012262 A1 | 1/2008 | Carabelli et al. | |
| 2008/0033612 A1 | 2/2008 | Raab | |
| 2008/0100018 A1 | 5/2008 | Dieziger | |
| 2008/0114509 A1 | 5/2008 | Inoue et al. | |
| 2008/0115994 A1 | 5/2008 | Martini | |
| 2008/0135320 A1 | 6/2008 | Matthies | |
| 2008/0164085 A1 | 7/2008 | Cecinini | |
| 2008/0197597 A1 | 8/2008 | Moulene et al. | |
| 2008/0197599 A1 | 8/2008 | Comstock et al. | |
| 2008/0223634 A1 | 9/2008 | Yamamoto et al. | |
| 2008/0227365 A1 | 9/2008 | Lo | |
| 2008/0238005 A1 | 10/2008 | James | |
| 2008/0255726 A1 | 10/2008 | Fischlein et al. | |
| 2008/0258416 A1 | 10/2008 | Wilcox | |
| 2008/0272562 A1 | 11/2008 | Sabelstrom et al. | |
| 2009/0026719 A1 | 1/2009 | Koch et al. | |
| 2009/0085311 A1 | 4/2009 | Kim et al. | |
| 2009/0105906 A1 | 4/2009 | Hackney et al. | |
| 2009/0108555 A1 | 4/2009 | Wilcox | |
| 2009/0171530 A1 | 7/2009 | Bousfield | |
| 2009/0194961 A1 | 8/2009 | Dieziger | |
| 2009/0194965 A1 | 8/2009 | Boston | |
| 2009/0197731 A1 | 8/2009 | Kobler | |
| 2009/0289437 A1 | 11/2009 | Steinhilber | |
| 2009/0299565 A1 | 12/2009 | Hara et al. | |
| 2009/0312908 A1 | 12/2009 | Van Den Brink | |
| 2009/0314566 A1 | 12/2009 | Rust | |
| 2009/0315282 A1 | 12/2009 | Kirchner | |
| 2010/0025944 A1 | 2/2010 | Hara et al. | |
| 2010/0030441 A1 | 2/2010 | Kosaka | |
| 2010/0032914 A1 | 2/2010 | Hara et al. | |
| 2010/0032915 A1 | 2/2010 | Hsu et al. | |
| 2010/0044977 A1 | 2/2010 | Hughes et al. | |
| 2010/0044979 A1 | 2/2010 | Haeusler et al. | |
| 2010/0152987 A1 | 6/2010 | Gorai | |
| 2010/0219600 A1 | 9/2010 | Dada | |
| 2011/0006498 A1 | 1/2011 | Mercier | |
| 2011/0095494 A1 | 4/2011 | White | |
| 2011/0148052 A1 | 6/2011 | Quemere | |
| 2011/0215544 A1 | 9/2011 | Rhodig | |
| 2011/0254238 A1 | 10/2011 | Kanou | |
| 2012/0098225 A1 | 4/2012 | Lucas | |
| 2012/0248717 A1 | 10/2012 | Tsujii et al. | |
| 2013/0062133 A1 | 3/2013 | Budweil | |
| 2013/0068550 A1 | 3/2013 | Gale | |
| 2013/0127131 A1* | 5/2013 | Michel | B60G 11/183 280/124.106 |
| 2013/0153311 A1 | 6/2013 | Huntzinger | |
| 2013/0168934 A1 | 7/2013 | Krajekian | |
| 2014/0252730 A1 | 9/2014 | Spahl et al. | |
| 2014/0252731 A1 | 9/2014 | Spahl et al. | |
| 2014/0252732 A1 | 9/2014 | Spahl et al. | |
| 2014/0252733 A1 | 9/2014 | Spahl et al. | |
| 2014/0252734 A1 | 9/2014 | Spahl et al. | |
| 2014/0312580 A1* | 10/2014 | Gale | B60G 21/073 280/5.509 |
| 2014/0346753 A1 | 11/2014 | Huang et al. | |
| 2014/0353937 A1* | 12/2014 | Girelli Consolaro | B60G 21/0551 280/124.128 |
| 2014/0365078 A1 | 12/2014 | Gerecke et al. | |
| 2015/0045171 A1 | 2/2015 | Schimpf et al. | |
| 2015/0094909 A1* | 4/2015 | Illg | B60G 17/0162 701/37 |
| 2016/0009180 A1 | 1/2016 | Barrass | |
| 2016/0059661 A1 | 3/2016 | Saeger et al. | |
| 2016/0059923 A1 | 3/2016 | Simon et al. | |
| 2016/0144680 A1 | 5/2016 | Simon et al. | |
| 2016/0244094 A1 | 8/2016 | Spahl et al. | |

FOREIGN PATENT DOCUMENTS

| | | |
|---|---|---|
| DE | 1937578 U | 1/1963 |
| DE | 6801096 U | 11/1967 |
| DE | 4035128 A1 | 6/1992 |
| DE | 4135585 A1 | 5/1993 |
| DE | 4236328 C1 | 9/1993 |
| DE | 4315017 C1 | 9/1994 |
| DE | 19621947 C1 | 10/1997 |
| DE | 19735912 A1 | 3/1998 |
| DE | 19717418 C1 | 10/1998 |
| DE | 19800292 A1 | 6/1999 |
| DE | 19848294 A1 | 10/1999 |
| DE | 19833828 C1 | 12/1999 |
| DE | 19846275 A1 | 12/1999 |
| DE | 19831162 A1 | 7/2000 |
| DE | 10251946 B3 | 3/2004 |
| DE | 10349655 A1 | 6/2005 |
| DE | 102004027202 A1 | 10/2005 |
| DE | 102004058523 A1 | 6/2006 |
| DE | 102007006546 A1 | 8/2007 |
| DE | 112006002581 T5 | 9/2008 |
| DE | 102007024769 A1 | 11/2008 |
| DE | 102008046588 A1 | 3/2010 |
| DE | 102009042662 A1 | 3/2011 |
| DE | 102010000884 A1 | 7/2011 |
| DE | 102010000886 A1 | 7/2011 |
| DE | 102010055947 A1 | 8/2011 |
| DE | 102010041404 A1 | 3/2012 |
| DE | 102010046317 A1 | 3/2012 |
| DE | 102012217416 A1 | 3/2014 |
| EP | 0592377 A1 | 4/1994 |
| EP | 0606191 A1 | 7/1994 |
| EP | 0626307 A1 | 11/1994 |
| EP | 0658453 A2 | 6/1995 |
| EP | 1030790 A1 | 8/2000 |
| EP | 1142779 A2 | 10/2001 |
| EP | 1153773 A2 | 11/2001 |
| EP | 1155950 A2 | 11/2001 |
| EP | 1180476 A1 | 2/2002 |
| EP | 1228905 A2 | 8/2002 |
| EP | 1346907 A2 | 9/2003 |
| EP | 1348617 A1 | 10/2003 |
| EP | 1419909 A2 | 5/2004 |
| EP | 1539563 A1 | 6/2005 |
| EP | 1600313 A1 | 11/2005 |
| EP | 1630081 A1 | 3/2006 |
| EP | 1702773 A2 | 9/2006 |
| EP | 1798081 A1 | 6/2007 |
| EP | 1872981 A1 | 1/2008 |
| EP | 1773609 B1 | 3/2008 |
| EP | 1944228 A1 | 7/2008 |
| EP | 2030814 A2 | 3/2009 |
| EP | 2077223 A1 | 7/2009 |
| EP | 2199122 A1 | 6/2010 |
| EP | 2213561 A1 | 8/2010 |
| EP | 2475570 B1 | 7/2012 |
| EP | 2712796 A2 | 4/2014 |
| ES | 2284383 A1 | 1/2007 |
| FR | 2663283 A1 | 12/1991 |
| FR | 2768203 A1 | 3/1999 |
| FR | 2858963 A1 | 2/2005 |
| FR | 2872699 A1 | 1/2006 |
| FR | 2927026 A1 | 8/2009 |
| FR | 2937000 A1 | 4/2010 |
| FR | 2946944 A1 | 12/2010 |
| FR | 2961746 A1 | 12/2011 |
| GB | 480191 A | 2/1938 |
| GB | 1157016 A | 7/1969 |
| GB | 2322837 A | 9/1998 |
| GB | 2382334 A | 11/2001 |
| GB | 2374327 A | 10/2002 |
| GB | 2390065 A | 12/2003 |
| GB | 2394701 A | 5/2004 |
| GB | 2444250 A | 6/2008 |

(56) References Cited

FOREIGN PATENT DOCUMENTS

| | | |
|---|---|---|
| GB | 2450740 A | 1/2009 |
| GB | 2472180 A | 2/2011 |
| GB | 2476877 A | 7/2011 |
| GB | 2492757 A | 1/2013 |
| JP | 4-69710 A | 3/1992 |
| JP | 4-71918 A | 3/1992 |
| JP | 4-108018 A | 4/1992 |
| JP | 2001-206036 A | 7/2001 |
| JP | 2003-81165 A | 3/2003 |
| JP | 2004-306850 A | 11/2004 |
| JP | 2005-193890 A | 7/2005 |
| JP | 2006-7865 A | 1/2006 |
| JP | 2006-44467 A | 2/2006 |
| JP | 2006-168503 A | 6/2006 |
| JP | 2006-232197 A | 9/2006 |
| JP | 2006248489 A | 9/2006 |
| JP | 2006-281918 A | 10/2006 |
| JP | 2006-341718 A | 12/2006 |
| JP | 2007-10511 A | 1/2007 |
| JP | 2007-69688 A | 3/2007 |
| JP | 2007-106332 A | 4/2007 |
| JP | 2007-161013 A | 6/2007 |
| JP | 2007-186179 A | 7/2007 |
| JP | 2007-210456 A | 8/2007 |
| JP | 2007-238056 A | 9/2007 |
| JP | 2008-1236 A | 1/2008 |
| JP | 2008-62854 A | 3/2008 |
| JP | 2008-120360 A | 5/2008 |
| JP | 2008-132933 A | 6/2008 |
| JP | 2009-270918 A | 11/2009 |
| JP | 2010-155486 A | 7/2010 |
| JP | 2010-168000 A | 8/2010 |
| JP | 2011230727 A | 11/2011 |
| JP | 2012153349 A | 8/2012 |
| WO | 94/06642 A1 | 3/1994 |
| WO | 96/27508 A1 | 9/1996 |
| WO | 97/09223 A1 | 3/1997 |
| WO | 97/27071 A1 | 7/1997 |
| WO | 99/41136 A1 | 8/1999 |
| WO | 99/47372 A1 | 9/1999 |
| WO | 99/54186 A1 | 10/1999 |
| WO | 02/24477 A1 | 3/2002 |
| WO | 02/068228 A1 | 9/2002 |
| WO | 03/021190 A1 | 3/2003 |
| WO | 03/057549 A1 | 7/2003 |
| WO | 2004/011319 A1 | 2/2004 |
| WO | 2004/041621 A1 | 5/2004 |
| WO | 2005/039955 A2 | 5/2005 |
| WO | 2005/058620 A1 | 6/2005 |
| WO | 2006/006859 A2 | 1/2006 |
| WO | 2006/129020 A1 | 12/2006 |
| WO | 2008/043870 A1 | 4/2008 |
| WO | 2008/044838 A1 | 4/2008 |
| WO | 2008/053827 A1 | 5/2008 |
| WO | 2008/065436 A1 | 6/2008 |
| WO | 2009/059099 A2 | 5/2009 |
| WO | 2009/074752 A2 | 6/2009 |
| WO | 2009/087595 A1 | 7/2009 |
| WO | 2009/106978 A1 | 9/2009 |
| WO | 2010/009928 A1 | 1/2010 |
| WO | 2010/015986 A1 | 2/2010 |
| WO | 2010/015987 A1 | 2/2010 |
| WO | 2010/035877 A1 | 4/2010 |
| WO | 2010/106385 A1 | 9/2010 |
| WO | 2010/116641 A1 | 10/2010 |
| WO | 2011005945 A1 | 1/2011 |
| WO | 2011/023862 A1 | 3/2011 |
| WO | 2011029795 A1 | 3/2011 |
| WO | 2011/053228 A1 | 5/2011 |
| WO | 2011/059456 A1 | 5/2011 |
| WO | 2011/074204 A1 | 6/2011 |
| WO | 2011/083335 A2 | 7/2011 |
| WO | 2011102108 A1 | 8/2011 |
| WO | 2011/107674 A1 | 9/2011 |
| WO | 2012031150 A2 | 3/2012 |
| WO | 2014009637 A1 | 1/2014 |

OTHER PUBLICATIONS

Office Action dated Oct. 10, 2014 for co-pending U.S. Appl. No. 14/201,602.
Office Action dated Sep. 4, 2014 for co-pending U.S. Appl. No. 14/201,628.
Office Action dated Dec. 26, 2014 for co-pending U.S. Appl. No. 14/201,628.
Office Action dated Mar. 11, 2015 for co-pending U.S. Appl. No. 14/201,628.
Office Action dated Jan. 29, 2015 for patented U.S. Appl. No. 14/201,616.
Office Action dated Dec. 19, 2014 for co-pending U.S. Appl. No. 14/201,586.
Office Action dated Jun. 1, 2015 for co-pending U.S. Appl. No. 14/201,586.
Office Action dated Jul. 28, 2015 for co-pending U.S. Appl. No. 14/201,628.
German Search Report for Application No. 10 2013 203 923.9 dated Oct. 8, 2013.
German Search Report for Application No. 10 2013 203 922.0 dated Oct. 14, 2013.
German Search Report for Application No. 10 2013 203 927.1 dated Nov. 5, 2013.
German Search Report for Application No. 10 2013 203 926.3 dated Oct. 31, 2013.
German Search Report for Application No. 10 2013 203 924.7 dated Oct. 24, 2013.
Notice of Allowance dated Mar. 19, 2015 for patented U.S. Appl. No. 14/201,550.
Notice of Allowance dated Sep. 28, 2015 for patented U.S. Appl. No. 14/201,586.
Notice of Allowance dated Feb. 3, 2015 for patented U.S. Appl. No. 14/201,602.
Notice of Allowance dated May 20, 2015 for patented U.S. Appl. No. 14/201,616.
Advisory Action dated Oct. 7, 2015 for co-pending U.S. Appl. No. 14/201,628.
Notice of Allowance dated Nov. 3, 2015 for co-pending U.S. Appl. No. 14/201,628.
Office Action dated Nov. 6, 2015 for co-pending U.S. Appl. No. 14/554,410.
Machine translation of German Examination Report dated May 28, 2015 for German Application No. 102014217386.8.
Machine translation of German Examination Report dated Apr. 30, 2015 for German Application No. 102014217246.2.
United Kingdom Search Report for related Application No. GB1520837.4, dated Apr. 13, 2016.
Office Action from co-pending U.S. Appl. No. 14/554,410.
Further United Kingdom Search Report for related Application No. GB1520837.4, dated May 4, 2016.
Non-Final Office Action dated Jun. 27, 2016 from co-pending U.S. Appl. No. 14/630,106.
Non-Final Office Action dated Aug. 3, 2016 from co-pending U.S. Appl. No. 14/554,410.
Non-Final Office Action dated Dec. 19, 2016 from co-pending U.S. Appl. No. 14/839,137.
Final Office Action dated Dec. 30, 2016 from co-pending U.S. Appl. No. 14/630,106.
Non-Final Office Action dated Jan. 5, 2017 from co-pending U.S. Appl. No. 14/842,099.
Notice of Allowance dated Jan. 27, 2017 from co-pending U.S. Appl. No. 14/554,410.
Chinese Notification of First Office Action for related Application No. CN201410083843.2, dated Mar. 24, 2017.
Chinese Notification of First Office Action for related Application No. CN201410083467.7, dated Mar. 24, 2017.

(56) References Cited

OTHER PUBLICATIONS

Advisory Action dated Mar. 27, 2017 from co-pending U.S. Appl. No. 14/630,106.
Chinese Notification of First Office Action for related Application No. CN201410083008.9, dated Apr. 6, 2017.
Non-Final Office Action dated May 5, 2017 from co-pending U.S. Appl. No. 14/630,106.
Chinese Notification of First Office Action for related Application No. CN201410082053.2, dated Apr. 27, 2017.
Chinese Notification of First Office Action for related Application No. CN201410081761.4, dated Mar. 29, 2017.
Final Office Action dated Jun. 6, 2017 from co-pending U.S. Appl. No. 14/839,137.
Notice of Allowance dated Jul. 3, 2017 from co-pending U.S. Appl. No. 14/842,099.
Notice of Allowance dated Aug. 21, 2017 from co-pending U.S. Appl. No. 14/839,137.
Notice of Allowance dated May 11, 2017 from co-pending U.S. Appl. No. 14/554,410.

* cited by examiner

REAR SUSPENSION SYSTEMS FOR LATERALLY TILTABLE MULTITRACK VEHICLES

TECHNICAL FIELD

The present disclosure relates generally to laterally tiltable multitrack vehicles, such as, for example, motor vehicles, and more particularly to rear suspensions for laterally tiltable multitrack vehicles.

BACKGROUND

In recent years, interest in motor vehicles with innovative designs has grown in view of the continued expansion of urban areas, the large number of vehicles operating in these areas, and the problems associated therewith, including, for example, traffic jams, parking shortages, and environmental pollution. One solution to such problems (i.e., parking and congestion) is to design vehicles in a manner that permits a plurality of vehicles to share a parking space or a driving lane. In order for such a solution to be feasible, however, such vehicles must be small and, in particular, narrow. Accordingly, vehicles of this type are usually sized to carry no more than one to two persons. Additionally, due to their small size and low weight, such vehicles generally require less engine power output than conventional motor vehicles, which may also reduce the emissions caused by such vehicles without compromising the driving performance of the vehicles.

In recent years, various attempts have therefore been made to develop a laterally tiltable multitrack vehicle, having either three or four wheels, in which the entire vehicle or a part thereof may tilt in toward a rotation center (e.g., a curve bend inner side) in a similar manner to a bicycle or motorcycle. In other words, both the body and wheels of a tiltable vehicle may lean into a curve during cornering such that the wheels stay parallel to the body throughout the curve. Accordingly, like a bicycle or motorcycle, such vehicles are statically in an instable equilibrium and would fall over without any external correction by the driver or another device. Unlike a bicycle or motorcycle, however, in which the vehicle can be easily stabilized by moving the center of gravity of the driver (i.e., via input from the driver), such tiltable multitrack vehicles generally require suspensions that can help stabilize the vehicle during cornering, or, for example, on banked roads.

Accordingly, various innovative suspensions also have been developed for laterally tiltable multitrack vehicles. Such suspensions, for example, generally incorporate a balancing device that can create a torque to influence the leaning angle of the vehicle. Additionally, for safety and ride comfort, such suspensions should also provide a spring/damping function between the body of the vehicle and the wheels of the vehicle, similar to the suspension spring/damper elements of a conventional motor vehicle.

It may, therefore, be desirable to provide a rear suspension system for a laterally tiltable multitrack vehicle that provides both a balancing function and a spring/damping function. It may be further desirable to provide a rear suspension system that provides a spring/damping function that does not compromise the system's balancing function to allow both weight and cost optimized suspension components.

SUMMARY

In accordance with various exemplary embodiments, a rear suspension system for a laterally tiltable, multitrack vehicle may include first and second trailing arms. The rear suspension system may further include first and second balancer systems acting between the first and second trailing arms. The first balancer system may create a torque to influence a leaning angle of the vehicle when the suspension system is in use. The second balancer system may suppress a resonant vertical motion of the vehicle when the suspension system is in use.

In accordance with various additional exemplary embodiments, a rear suspension system for a laterally tiltable, multitrack vehicle may include first and second trailing arms, each trailing arm extending between a rear wheel of the vehicle and a frame rail of the vehicle. The rear suspension system may also include a first balancer system acting between the first and second trailing arms. The first balancer system may be configured to create a torque to influence a leaning angle of a body of the vehicle. The rear suspension system may further include a second balancer system acting between the first and second trailing arms. The second balancer system may be configured to suppress a resonant vertical motion of the body of the vehicle.

In accordance with various further exemplary embodiments, a method of stabilizing a tiltable, multitrack vehicle may include distributing a first load via a first balancer system during a roll motion of the vehicle. The method may further include distributing a second load via a second balancer system during a jounce/rebound motion of the vehicle, the second balancer system differing from the first balancer system. Distributing the first load may influence a leaning angle of the vehicle. Distributing the second load may suppress a resonant vertical motion of the vehicle.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates a rear suspension system for a laterally tiltable, multitrack vehicle that has independent leaning and spring/damper functions. In this manner, the suspension system may provide both functions (i.e., leaning and damping), without compromising the performance of either function. For instance, the exemplary embodiments described herein may utilize both a balancing actuator and at least one spring/damper element, while providing a separate load path for each function. Various exemplary embodiments described herein, for example, contemplate a rear suspension system comprising two separate balancer systems to separate the load paths of the leaning and spring/damper functions, thereby allowing the at least one spring/damper element to be compressed/expanded during a jounce/rebound motion of the vehicle (e.g., due to bumps in the road), while only experiencing minor length changes during a roll motion of the vehicle (e.g., during cornering of the vehicle).

Figure 1:
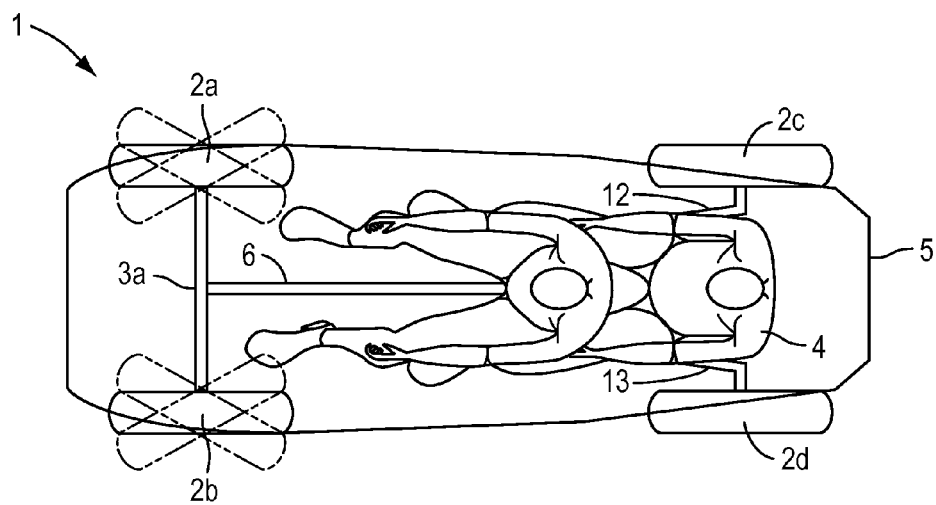
FIG. 1 is a plan view of an exemplary embodiment of a multitrack, laterally tiltable vehicle in accordance with the present disclosure.
Figure 2:
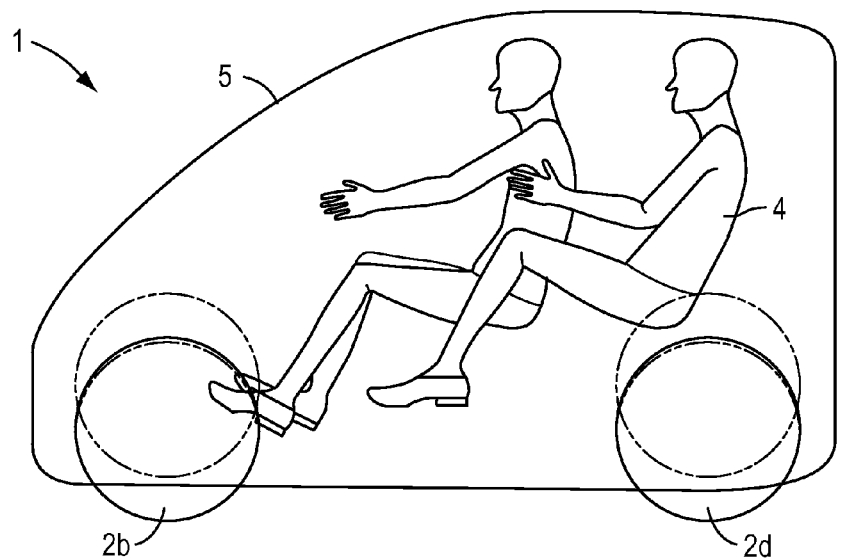
FIG. 2 is a side view of the multitrack, laterally tiltable vehicle of FIG. 1.
Figure 3:
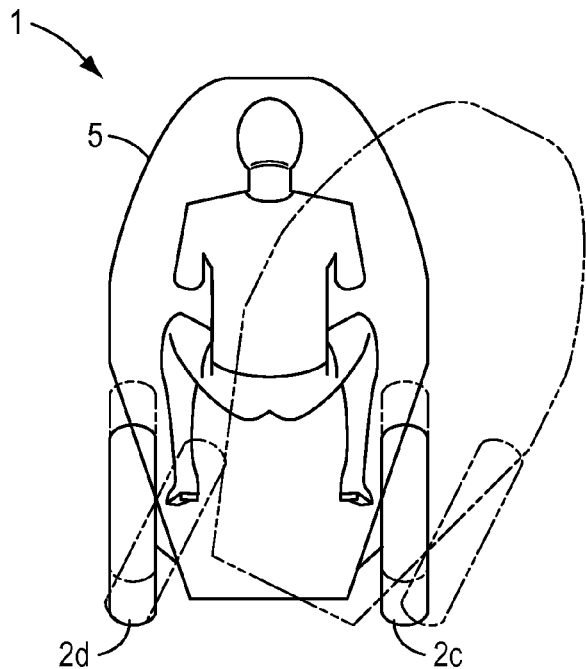
FIG. 3 is a rear view of the multitrack, laterally tiltable vehicle of FIG. 1.

FIGS. 1-3 illustrate an exemplary embodiment of a multitrack, laterally tiltable vehicle in accordance with the present disclosure. As shown in FIGS. 1-3, a vehicle 1 may include four wheels 2a, 2b, 2c, and 2d. Front wheel 2a is mounted on the right side of a front axle 3a of the vehicle 1 and front wheel 2b is mounted on the left side of the front axle 3a. Rear wheel 2c is mounted on the right side of the vehicle 1 to a right rear trailing arm 12 of the vehicle 1 and rear wheel 2d is mounted on the left side of the vehicle 1 to a left rear trailing arm 13 of the vehicle 1. In various embodiments, the vehicle 1 is designed for transporting one to two persons or occupants 4. As shown in the exemplary embodiment of FIGS. 1-3, in accordance with various exemplary embodiments, the vehicle 1 may be designed such that the two occupants 4 sit one behind the other in the vehicle 1. In accordance with various additional embodiments, the vehicle 1 may also have a closed body 5 that forms a cabin to protect the occupants 4, for example, from weather, and provides additional protection in the event of an accident.

Those of ordinary skill in the art would understand that the vehicle 1 illustrated in FIGS. 1-3 is exemplary only and intended to illustrate one embodiment of a multitrack, laterally tiltable vehicle in accordance with the present disclosure. Accordingly, multitrack, laterally tiltable vehicles in accordance with the present disclosure may have various body designs, occupant configurations, and numbers and/or configurations of wheels without departing from the scope of the present disclosure and claims. For example, although the vehicle illustrated and described with reference to FIGS. 1-3 includes four wheels 2a, 2b, 2c, and 2d, various additional embodiments of the present disclosure contemplate a vehicle that has only three wheels. Furthermore, those of ordinary skill in the art would understand that the vehicle 1, may have any type of motor or power source known to those of ordinary skill, including, but not limit to, an electric motor, a combustion engine, or a combination thereof (i.e., a hybrid drive).

As shown in the rear view of FIG. 3, both the vehicle body 5 and the wheels 2a, 2b, 2c, and 2d may tilt during the lateral tilting of the vehicle 1. In other words, both the body 5 and the wheels 2a, 2b, 2c, and 2d may lean into a curve during the cornering of the vehicle 1 such that the wheels 2a, 2b, 2c, and 2d stay mainly parallel to the body 5 throughout the curve. Accordingly, as such, vehicle 1 is statically in an instable equilibrium, and may fall over without an external correction. Thus, as above, vehicle 1 requires a suspension system, such as, for example, a rear suspension system, that can help stabilize the vehicle during cornering and provide increased safety and ride comfort (i.e., through the damping of vehicle jounce/rebound motion).

Figure 4:
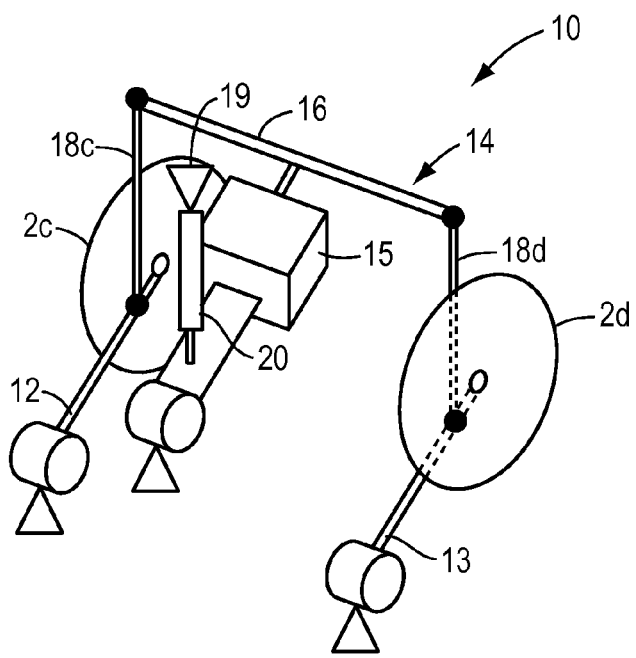
FIG. 4 is a schematic view of a conventional rear suspension system within the multitrack, laterally tiltable vehicle of FIG.
Figure 5:
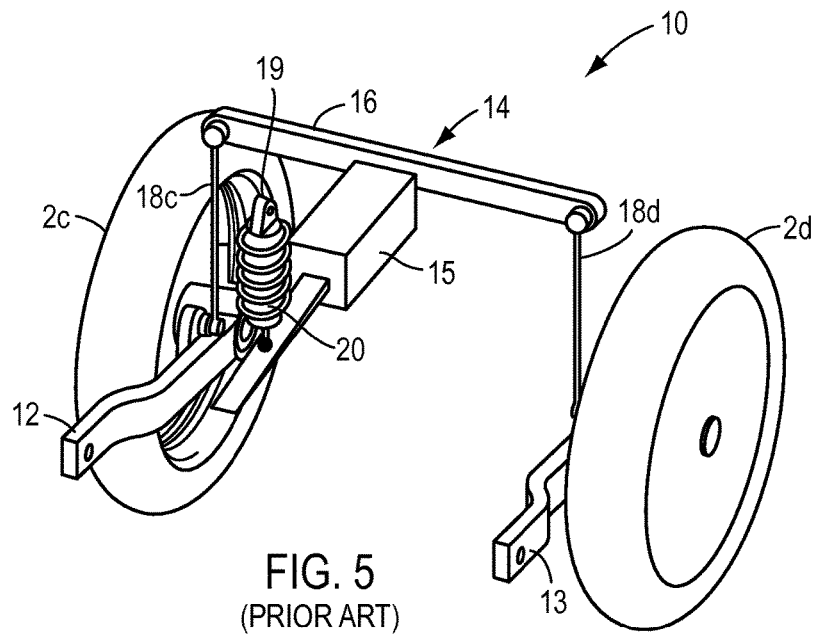
FIG. 5 is a perspective view of the conventional rear suspension system of FIG. 4.

FIGS. 4 and 5 illustrate an exemplary arrangement of the components of a conventional rear suspension system for a multitrack, laterally tiltable vehicle such as the vehicle 1. The suspension system 10 includes a pair of trailing arms 12, 13 respectively connected to the rear wheels 2c, 2d of the vehicle 1, and a balancer system 14 that is connected to the trailing arms 12, 13 via, for example, a pair of respective links 18c, 18d. The balancer system 14 includes, for example, an actuator (i.e., torque device) 15, which is connected to a balancer control arm 16 and to the body 5 of the vehicle 1 (e.g., at a body mount 19) via, for example, a spring/damper element 20. The balancer control arm 16 extends between the trailing arms 12, 13 of the suspension system 10. In this manner, as would be understood by those of ordinary skill in the art, the balancer system 14 may create a leaning torque via the actuator 15 to influence a leaning angle of the vehicle 1. As above, to suppress vibration of the vehicle 1, the suspension system 10 may also include at least one spring/damper element 20 that is positioned between the balancer control arm 16 and the body 5 of the vehicle 1. As would be understood by those of ordinary skill in the art, however, this configuration links the balancer control arm 16 to the spring/damper element 20 such that the balancer 16 must also carry the suspension and road loads of the spring/ damper element 20. In other words, all the vertical forces that go into the spring/damper element 20 also go into the balancer control arm 16.

Figure 6:
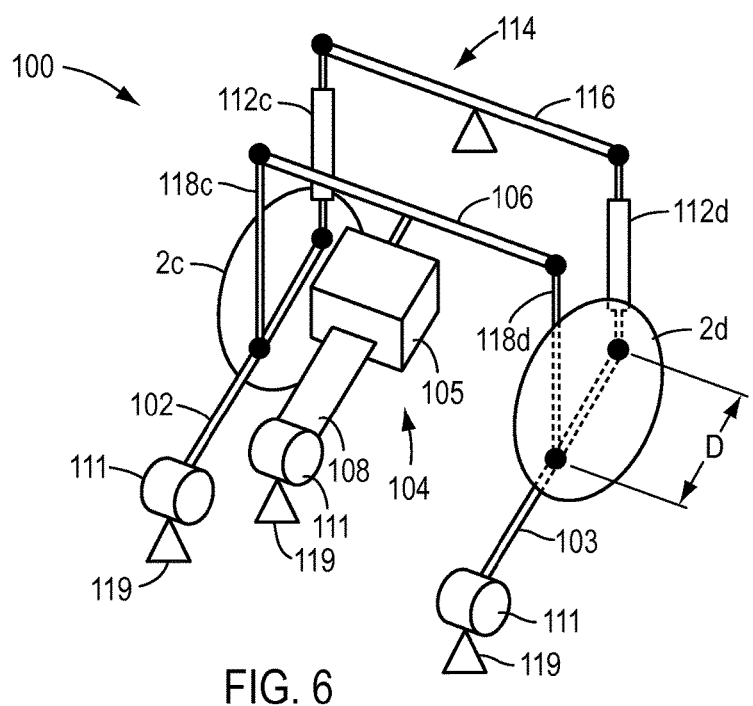
FIG. 6 is a schematic view of an exemplary embodiment of a rear suspension system for use within the multitrack, laterally tiltable vehicle of FIG. 1, in accordance with the present disclosure.
Figure 7:
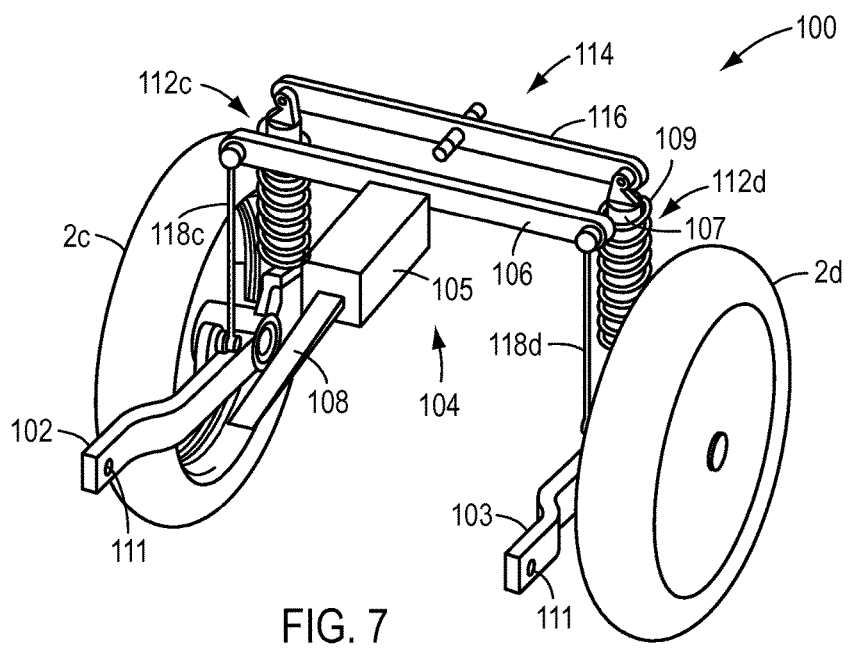
FIG. 7 is a perspective view of the suspension system of FIG. 6.

FIGS. 6 and 7 illustrate an exemplary embodiment of a rear suspension system 100 for a multitrack, laterally tiltable vehicle, such as, for example, the vehicle 1, in accordance with the present disclosure. Similar to the conventional suspension system 10 illustrated in FIGS. 4 and 5, the suspension system 100 includes a balancer system 104 comprising an actuator 105 that is configured to create a torque to influence a leaning angle of the vehicle 1 and at least one spring/damper element, the system 100 comprising two spring/damper elements 112c, 112d, that are configured to suppress the otherwise resonant up and down (i.e., vertical) motions of the vehicle 1. Unlike the system 10, however, the suspension system 100 provides separate load paths for each of its leaning and spring/damper functions. In accordance with various embodiments, for example, the suspension system 100 includes two separate balancer systems to separate the load paths of the leaning and spring/damper functions.

In various embodiments of the present disclosure, for example, the rear suspension system 100 includes first and second trailing arms 102, 103 respectively connected to each wheel 2c, 2d. In accordance with various embodiments, for example, the suspension system 100 may be in the form of a trailing-arm suspension (or a trailing-link suspension) and may utilize two parallel arms to locate the wheels 2c, 2d. Thus, in accordance with such embodiments, as shown best perhaps in FIG. 6, each trailing arm 102, 103 may also include a joint 111 for mounting (e.g., at a body mount 119) the trailing arm to a frame rail 6 (see FIG. 1) of the vehicle 1.

In accordance with various exemplary embodiments, for example, when the suspension system 100 is in use, the first and second trailing arms 102, 103 are each respectively connected to a hub (not shown) that is disposed within an internal space of the rear wheels 2c, 2d. Thus, when the suspension system 100 is in use, the trailing arms 102, 103 are arranged on either side of the frame rail 6 (which is connected to the body 5) of the vehicle 1, such that the first trailing arm 102 extends between the rear wheel 2c and the frame rail 6 and the second trailing arm 103 extends between the rear wheel 2d and the frame rail 6.

As used herein, the term "frame rail" refers to any type of vehicle frame rail, including but not limited to, rails that form the main structure of the chassis (i.e., the body) of the motor vehicle and subframe rails that form frame sections that attach to the chassis.

Those of ordinary skill in the art would understand, however, that the suspension system 100 of FIGS. 6 and 7 is exemplary only in that the trailing arms 102, 103 may have various alternative configurations (i.e., shapes and/or cross-sections), lengths, dimensions, and/or connection/mounting points without departing from the scope of the present disclosure and claims. Those of ordinary skill in the art would understand, for example, that the longitudinal length D (see FIG. 6) between respective connecting rods 118c, 118d and spring/damper elements 112c, 112d may vary and may be chosen based upon a particular suspension application and the available package space within the vehicle. Furthermore, the trailing arms 102, 103 may be configured to connect to the wheels 2c, 2d and the frame rail 6 via any method and/or technique known to those of ordinary skill in the art.

The suspension system 100 also includes first and second balancer systems 104 and 114 acting between the first and second trailing arms 102, 103. As illustrated in FIGS. 6 and 7, in accordance with various embodiments, the first balancer system 104 includes a first balancer control arm 106 extending in a transverse direction between the trailing arms 102, 103, a first hinged control arm 108 connected to the first balancer control arm 106, and an actuator 105 attached to the first hinged control arm 108. In various embodiments, for example, the first hinged control arm 108 is configured to connect the first balancer control arm 106 to the body 5 of the vehicle 1 (via, e.g., a joint 111 and mount 119) and transfer all actuator loads from the body 5 to the first balancer control arm 106, while also permitting a jounce/rebound motion of the vehicle 1.

The actuator 105 is also attached to the first hinged control arm 108. In this manner, when the suspension system 100 is in use, the actuator 105 may apply a torque to the first balancer control arm 106 to rotate the first balancer control arm 106 (e.g., to influence a leaning angle of the vehicle body 5) without being subjected to the loads from the vehicle body 5. In accordance with various embodiments, for example, the first balancer arm 106 may be pivotally connected to each of the trailing arms 102, 103 via a respective connecting rod 118c, 118d. Thus, when the suspension system 100 is in use, the rotational forces (i.e., counteracting torque) provided by the actuator 105 may be transmitted to the trailing arms 102, 103 (and the wheels 2c, 2d) via the connecting rods 118c, 118d.

As used herein, the term "actuator" refers to any type of device or motor that can create a torque, including but not limited to, an electric motor and/or a hydraulic motor. Accordingly, actuators in accordance with the present disclosure may be operated by various sources of energy, including, for example, an electric current, a battery, hydraulic fluid pressure, or pneumatic pressure, and may convert that energy into rotational motion.

As above, the suspension system 100 also includes a second balancer system 114 acting between the first and second trailing arms 102, 103. In accordance with various exemplary embodiments, the second balancer system 114 includes a second balancer control arm 116 extending in a transverse direction between the trailing arms 102, 103, and at least one spring/damper element. As illustrated in FIGS. 6 and 7, in various exemplary embodiments, the second balancer system 114 includes two vertical spring/damper elements 112c, 112d connected to opposite ends of the second balancer control arm 116, which extend vertically between the control arm 116 and respective trailing arms 102, 103.

As shown in FIG. 7, each spring/damper element 112c, 112d may include a shock absorber 107 and a coil spring 109. In this manner, when the suspension system 100 is in use, the spring/damper elements 112c, 112d are configured to be compressed and expanded during the jounce/rebound motion of the vehicle 1 to suppress what would otherwise become a resonant up and down motion of the vehicle 1.

As above, those of ordinary skill in the art would understand that the suspension system 100 of FIGS. 6 and 7 is exemplary only and intended to illustrate one embodiment of a rear suspension system in accordance with the present disclosure. FIGS. 8-12, for example, illustrate various additional exemplary embodiments of suspension systems 200, 300, 400, 500, and 600 contemplated by the present disclosure, which like the suspension system 100, include two separate balancer systems to separate the load paths of the leaning and spring/damper functions of the suspensions.

Figure 8:
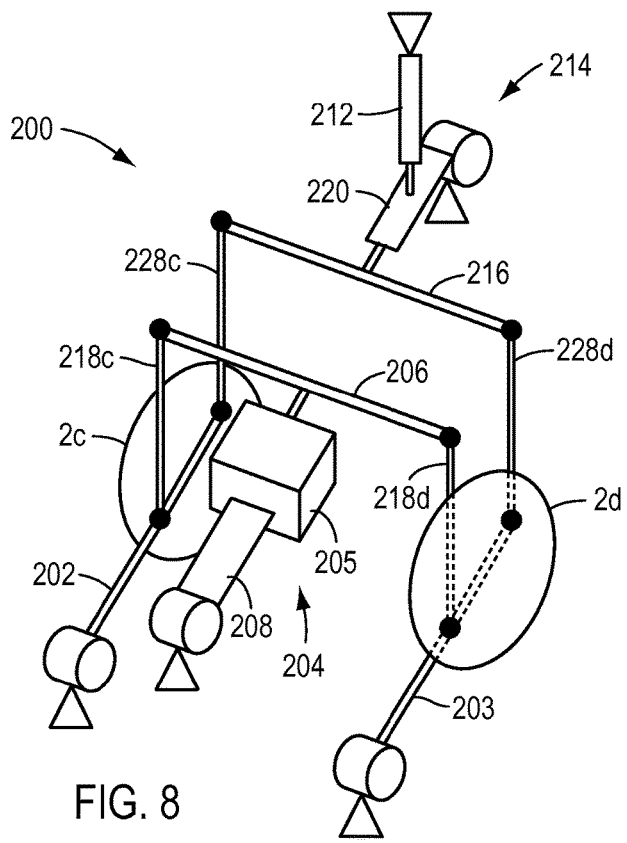
FIG. 8 is a schematic view of another exemplary embodiment of a rear suspension system for use within the multitrack, laterally tiltable vehicle of FIG. 1, in accordance with the present disclosure.
Figure 9:
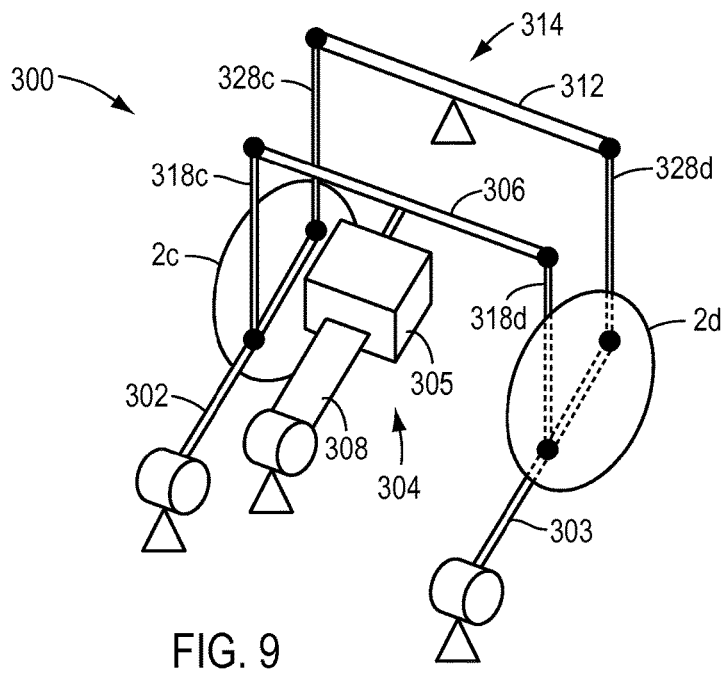
FIG. 9 is a schematic view of yet another exemplary embodiment of a rear suspension system for use within the multitrack, laterally tiltable vehicle of FIG. 1, in accordance with the present disclosure.
Figure 10:
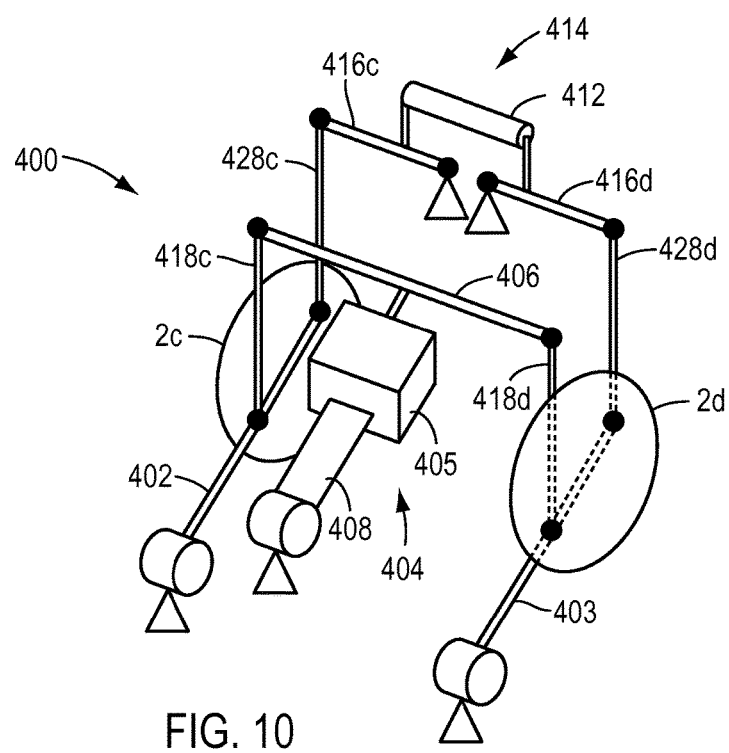
FIG. 10 is a schematic view of yet another exemplary embodiment of a rear suspension system for use within the multitrack, laterally tiltable vehicle of FIG. 1, in accordance with the present disclosure.

FIGS. 8-10 respectively illustrate exemplary embodiments of a rear suspension system 200, 300, and 400 for a multitrack, laterally tiltable vehicle, such as, for example, the vehicle 1. Similar to the suspension system 100 illustrated in FIGS. 6 and 7, each suspension system 200, 300, and 400 includes first and second trailing arms 202, 203; 302, 303; and 402, 403 respectively connected to each wheel 2c, 2d. Each suspension system 200, 300, and 400 also includes first and second balancer systems 204, 214; 304, 314; and 404, 414 acting between the first and second trailing arms 202, 203; 302, 303; and 402, 403. Similar to the system 100, each first balancer system 204, 304, 404 includes a first balancer control arm 206, 306, 406 extending in a transverse direction between the trailing arms 202, 203; 302, 303; 402, 403, a first hinged control arm 208, 308, 408 connected to the first balancer control arm 206, 306, 406, and an actuator 205, 305, 405 attached to the first hinged control arm 208, 308, 408.

Like system 100, each actuator 205, 305, 405 is also attached to the first hinged control arm 208, 308, 408. Thus, as above, when the suspension system 200, 300, 400 is in use, the actuator 205, 305, 405 may apply a torque to the first balancer control arm 206, 306, 406 to rotate the first balancer control arm 206, 306, 406 (e.g., to influence a leaning angle of the vehicle body 5) without being subjected to the loads from the vehicle body 5. Thus, in a similar manner to system 100, the first balancer control arm 206, 306, 406 may be pivotally connected to each of the trailing arms 202, 203; 302, 303; 402, 403 via a respective connecting rod 218c, 218d; 318c, 318d; 418c, 418d, which may transmit the rotational forces provided by the actuator 205, 305, 405 to the trailing arms 202, 203; 302, 303; 402, 403 (and the wheels 2c, 2d) when the suspension system 200, 300, 400 is in use.

Each suspension system 200, 300, 400 also includes a second balancer system 214, 314, 414 acting between the first and second trailing arms 202, 203; 302, 303; 402, 403. As illustrated in FIG. 8, in accordance with various embodiments, the second balancer system 214 includes a second balancer control arm 216 extending in a transverse direction between the trailing arms 202, 203, which is pivotally connected to each of the trailing arms 202, 203 via a respective connecting rod 228c, 228d. The second balancer system 214 further includes a second hinged control arm 220 that is connected to the second balancer control arm 216, and a vertical spring/damper element 212 that is connected to the second hinged control arm 220.

As illustrated in FIG. 9, in accordance with various additional embodiments, the second balancer system 314 includes a leaf spring 312 extending in a transverse direction between the trailing arms 302, 303, which is pivotally connected to each of the trailing arms 302, 303 via a respective connecting rod 328c, 328d.

As illustrated in FIG. 10, in accordance with various further embodiments, the second balancer system 414 includes two link arms 416c, 416d and a lateral spring/damper element 412 operating between the link arms 416c, 416d. As shown in FIG. 10, each link arm 416c, 416d is pivotally connected to a trailing arm 402, 403 via a respective connecting rod 428c, 428d, and extends in a transverse direction between the trailing arms 402, 403. In this manner, the link arms 416c, 416d may extend toward one another between the trailing arms 402, 403 to support a lateral spring/damper element 412 therebetween. In various embodiments, for example, the link arm 416c may support a first end of the lateral spring/damper element 412 and the link arm 416d may support a second end of the lateral spring/damper element 412, as illustrated in FIG. 10.

Figure 11:
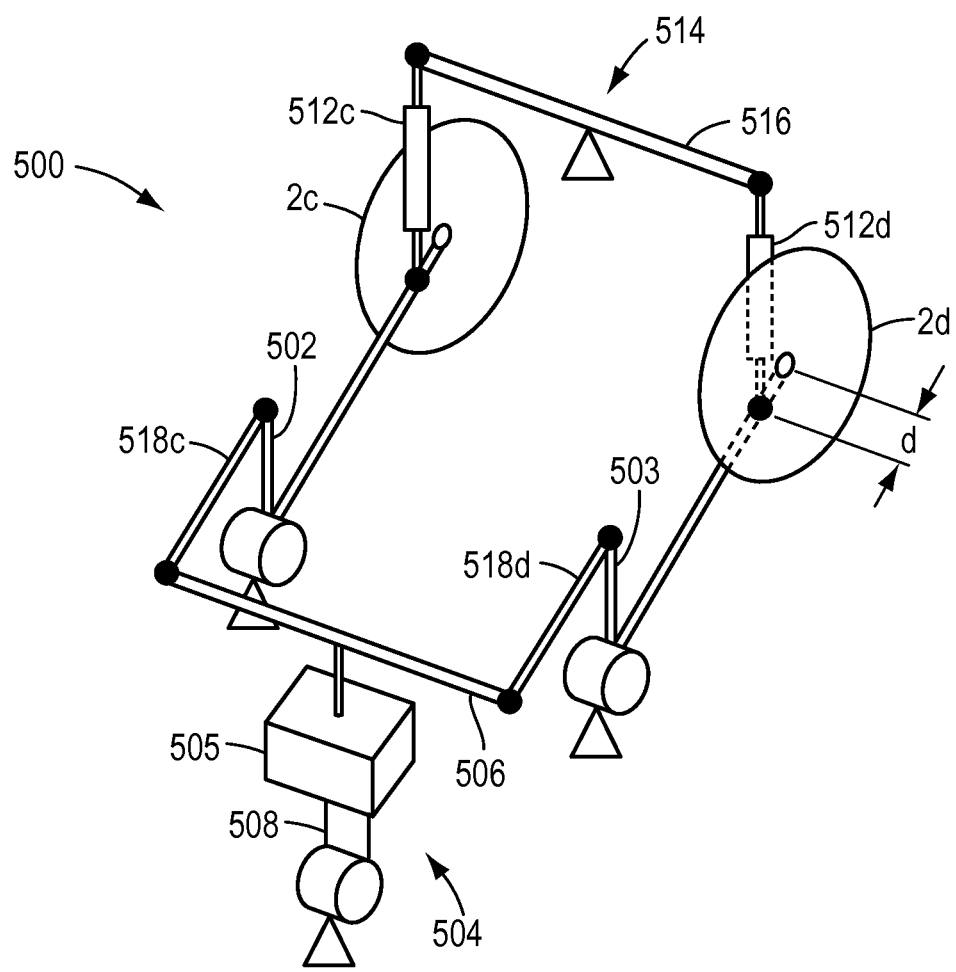
FIG. 11 is a schematic view of yet another exemplary embodiment of a rear suspension system for use within the multitrack, laterally tiltable vehicle of FIG. 1, in accordance with the present disclosure.
Figure 12:
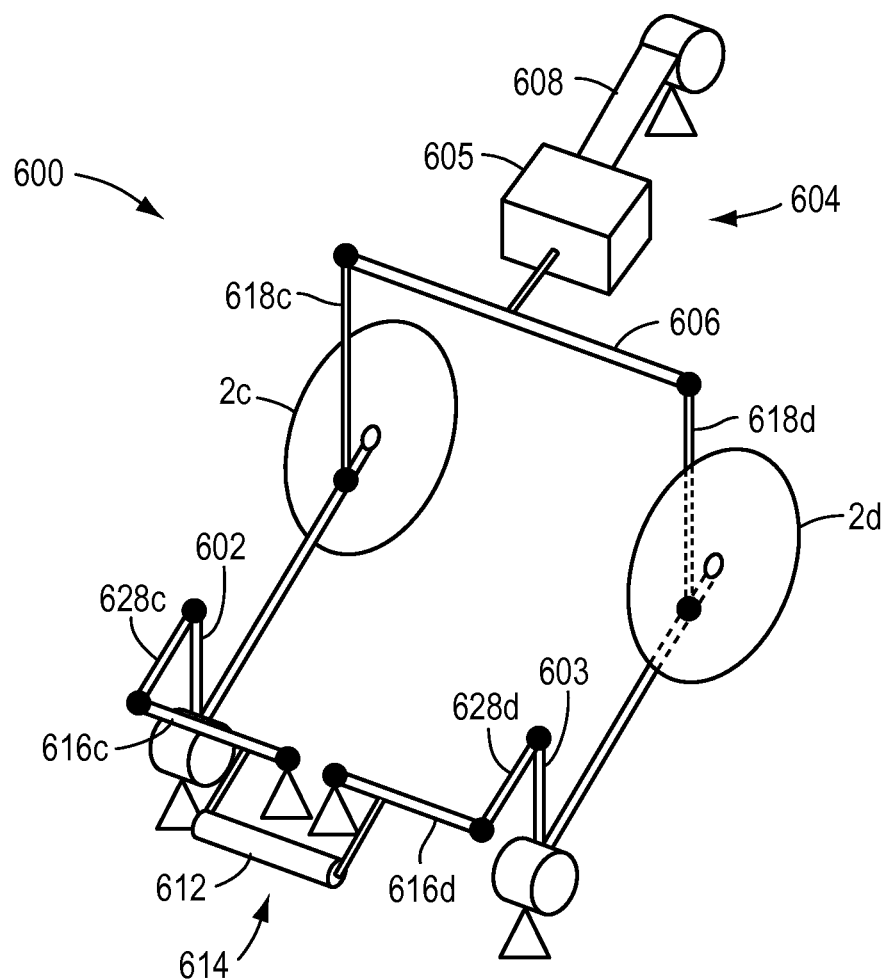
FIG. 12 is a schematic view of yet another exemplary embodiment of a rear suspension system for use within the multitrack, laterally tiltable vehicle of FIG. 1, in accordance with the present disclosure.

FIGS. 11 and 12 respectively illustrate additional exemplary embodiments of rear suspension systems 500 and 600 for a multitrack, laterally tiltable vehicle, such as, for example, the vehicle 1. Similar to the suspension systems 100, 200, 300, and 400 illustrated in FIGS. 6-10, each suspension system 500, 600 includes first and second trailing arms 502, 503; 602, 603 respectively connected to each wheel 2c, 2d, and first and second balancer systems 504, 514; 604, 614 acting between the first and second trailing arms 502, 503; 602, 603. In contrast to the suspension systems illustrated above, however, the suspension systems 500 and 600 each utilize about a 90 degree angle on each of the trailing arms 502, 503; 602, 603 to move the various components carried by the trailing arms 502, 503; 602, 603 into a better package space within the vehicle 1. Those of ordinary skill in the art would understand, however, that the suspension systems 500 and 600 are exemplary only and that the suspension systems 500 and 600 may utilize various trailing arms 502, 503; 602, 603 having various angles, in order to move the various components carried by the trailing arms 502, 503; 602, 603 into an appropriate package space within the vehicle 1.

With reference to FIG. 11, similar to the embodiments of FIGS. 6-10, the suspension system 500 includes a first balancer system having a first balancer control arm 506 extending in a transverse direction between the trailing arms 502, 503, a first hinged control arm 508 connected to the first balancer control arm 506, and an actuator 505 attached to the first hinged control arm 508. As above, when the suspension system 500 is in use, the actuator 505 may therefore apply a torque to the first balancer control arm 508 to rotate the first balancer control arm 506 (e.g., to influence a leaning angle of the vehicle body 5) without being subjected to the loads from the vehicle body 5.

Thus, in a similar manner, the first balancer control arm 506 may be pivotally connected to each of the trailing arms 502, 503 via a respective connecting rod 518c, 518d, which may transmit the rotational forces provided by the actuator 505 to the trailing arms 502, 503 (and the wheels 2c, 2d) when the suspension system 500 is in use. As illustrated in FIG. 11, however, since the trailing arms 502, 503 have about a 90 degree angle, the connecting rods 518c, 518d may be situated parallel to a lower portion of the trailing arms 502, 503 (and to the ground). In this manner, the trailing arms 502, 503 may reposition the actuator 505 with respect to the body 5 of the vehicle 1 to move the actuator 505 into a better package space within the body 5 of the vehicle 1.

As above, the suspension system 500 also includes a second balancer system 514 acting between the first and second trailing arms 502, 503. Similar to the embodiments of FIGS. 6 and 7, the second balancer system 514 includes a second balancer control arm 516 extending in a transverse direction between the trailing arms 502, 503, and two vertical spring/damper elements 112c, 112d connected to opposite ends of the second balancer control arm 116 and extending vertically between the control arm 516 and respective trailing arms 502, 503.

With reference to FIG. 12, also similar to the embodiments of FIGS. 6-10, the suspension system 600 includes a first balancer system having a first balancer control arm 606 extending in a transverse direction between the trailing arms 602, 603, a first hinged control arm 608 connected to the first balancer control arm 606, and an actuator 605 attached to the first hinged control arm 608. Thus, in a similar manner, when the suspension system 600 is in use, the actuator 605 may apply a torque to the first balancer control arm 608 to rotate the first balancer control arm 606 (e.g., to influence a leaning angle of the vehicle body 5) without being subjected to the loads from the vehicle body 5. As above, the first balancer control arm 606 may therefore be pivotally connected to each of the trailing arms 602, 603 via a respective connecting rod 618c, 618d, which may transmit the rotational forces provided by the actuator 605 to the trailing arms 602, 603 (and the wheels 2c, 2d) when the suspension system 600 is in use.

As above, the suspension system 600 also includes a second balancer system 614 acting between the first and second trailing arms 602, 603. Similar to the embodiment of FIG. 10, the second balancer system 614 includes two link arms 616c, 616d and a lateral spring/damper element 612 operating between the link arms 616c, 616d. As above, each link arm 616c, 616d is pivotally connected to a trailing arm 602, 603 via a respective connecting rod 628c, 628d, and extends in a transverse direction between the trailing arms 602, 603. In this manner, similar to the embodiment of FIG. 10, the link arms 616c, 616d may extend toward one another between the trailing arms 602, 603 to support a lateral spring/damper element 612 therebetween. As illustrated in FIG. 12, however, since the trailing arms 502, 503 have about a 90 degree angle, the connecting rods 628c, 628d may be situated parallel to a lower portion of the trailing arms 602, 603 (and to the ground). In this manner, the trailing arms 602, 603 may reposition the lateral spring/damper element 612 with respect to the body 5 of the vehicle 1 to move the lateral spring/damper element 612 into a better package space within the body 5 of the vehicle 1.

As above, those of ordinary skill in the art would understand that the suspension systems 200, 300, 400, 500, and 600 of FIGS. 8-12 are exemplary only, and that the first and second balancer systems portrayed in FIGS. 8-12 may have various alternative configurations, components, arrangements of components, interface locations with the trailing arms to which they connect, and/or longitudinal lengths therebetween to create both a torque to influence a leaning angle of a vehicle and suppress a resonant vertical motion of the vehicle, without departing from the scope of the present disclosure and claims. Those of ordinary skill in the art would understand, for example, that both the longitudinal length D (see FIG. 6) between the balancer systems and the longitudinal length d (see FIG. 11) between the rear balancer interface (i.e., with the trailing arms) and the wheel hub may vary and may be chosen based upon a particular suspension application and the available package space within the vehicle.

Furthermore, those of ordinary skill in the art would understand that the positions of the actuator and spring/damper element are interchangeable. In other words, as illustrated in FIGS. 6-11, in various embodiments, the first balancer system which creates the torque (and carries the actuator) is the front balancer; while the second balancer system which suppresses the resonant vertical motion (and carries the at least one spring/damper element) is the rear balancer. And, as illustrated in FIG. 12, in various additional embodiments, the second balancer system (which carries the at least one spring/damper element) is the front balancer; while the first balancer system (which carries the actuator) is the rear balancer. The present disclosure, therefore, contemplates switching the positions of the first and second balancer systems based on the available package space within the vehicle.

An exemplary method for stabilizing a tiltable, multitrack vehicle in accordance with an exemplary embodiment of the present disclosure is set forth in the following description with reference to the vehicle 1 of the embodiment of FIGS. 1-3. To stabilize the vehicle 1 during a roll motion of the vehicle 1, a first load may be distributed via a first balancer system. As described above, for example, as the vehicle 1 goes around a bend, the vehicle 1 may tilt into the bend such that wheels 2c, 2d and the body 5 of the vehicle 1 lean into the bend. To stabilize the vehicle 1 (e.g., preventing overturning of the vehicle 1), a balancer system 104 (see FIGS. 6 and 7) may act to counteract the torque created by the lean of the vehicle 1. In this manner, in accordance with various embodiments, distributing the first load may influence a leaning angle of the vehicle 1.

To stabilize the vehicle during a jounce/rebound motion of the vehicle 1, a second load may be distributed via a second balancer system that differs from the first balancer system. As also described above, as the vehicle 1 goes over a bump in the road, a vibrational motion may develop between the body 5 of the vehicle 1 and the wheels 2c, 2d of the vehicle 1. To stabilize the vehicle 1 (e.g., preventing a resonant up and down motion of the vehicle 1), a balancer system 114 (see FIGS. 6 and 7) may act to dampen out the vibrational motion created by the uneven road conditions. In this manner, in accordance with various embodiments, distributing the second load may suppress a resonant vertical (i.e., up and down) motion of the vehicle 1.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to automotive vehicles, and rear suspensions, those of ordinary skill in the art would understand that the present teachings as disclosed would work equally well for any type of vehicle having wheels connected to the vehicle via any type of suspension system.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "an actuator" includes two or more different actuators. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A rear suspension for a laterally tiltable, multitrack vehicle, comprising:
   first and second balancer systems extending transversely between and independently connecting first and second trailing arms to form first and second independent load paths, respectively,
   wherein the first balancer system creates a torque along the first load path to influence a leaning angle of the vehicle and the second balancer system suppresses a resonant vertical motion of the vehicle along the second load path.

2. The rear suspension of claim 1, wherein the first and second trailing arms are parallel to one another.

3. The rear suspension of claim 1, wherein, when the suspension is in use, the first and second trailing arms are each configured to extend between a rear wheel of the vehicle and a frame rail of the vehicle.

4. The rear suspension of claim 1, wherein the first balancer system comprises a first balancer control arm extending in a transverse direction between and connected to each of the first and second trailing arms, a first hinged control arm connected to the first balancer control arm, and an actuator attached to the first hinged control arm.

5. The rear suspension of claim 1, wherein the second balancer system comprises two link arms and a lateral spring/damper element operating between the link arms.

6. The rear suspension of claim 1, wherein the second balancer system comprises a leaf spring.

7. The rear suspension of claim 1, wherein the second balancer system comprises a second balancer control arm extending in a transverse direction between and connected to each of the first and second trailing arms and at least one spring/damper element.

8. The rear suspension of claim 7, wherein the at least one spring/damper element comprises a shock absorber and a coil spring.

9. The rear suspension of claim 7, wherein the second balancer system comprises two vertical spring/damper elements connected to opposite ends of the second balancer control arm.

10. The rear suspension of claim 7, wherein the second balancer system further comprises a second hinged control arm connected to the second balancer control arm, and wherein the at least one spring/damper element is connected to the second hinged control arm.

11. The rear suspension of claim 1, wherein each of the first and second trailing arms has about a 90 degree angle.

12. The rear suspension of claim 11, wherein the first balancer system comprises an actuator, and wherein the first and second trailing arms are configured to reposition the actuator with respect to a body of the vehicle.

13. The rear suspension of claim 11, wherein the second balancer system comprises a lateral spring/damper element, and wherein the first and second trailing arms are configured to reposition the spring/damper element with respect to a body of the vehicle.

14. The rear suspension of claim 1, wherein the first balancer system comprises a first balancer control arm and the second balancer system comprises a second balancer control arm, the first and second balancer control arms extending adjacent to one another in parallel between and transverse to the first and second trailing arms.

15. The rear suspension of claim 14, wherein the first balancer system comprises a vertical connecting rod at each end of the first balancer control arm, the vertical connecting rods connecting the first balancer system to the first and second trailing arms.

16. A rear suspension for a laterally tiltable, multitrack vehicle, comprising:
   first and second trailing arms, each of the first and second trailing arms extending between a rear wheel of the vehicle and a frame rail of the vehicle;
   a first balancer system extending transversely between and connected to each of the first and second trailing arms, the first balancer system being configured to create a torque to influence a leaning angle of a body of the vehicle and to provide a first load path for the torque; and
   a second balancer system extending transversely between and connected to each of the first and second trailing arms, the second balancer system being configured to provide a second load path for suspension and road loads and to suppress a resonant vertical motion of the body of the vehicle caused by the suspension and road loads,
   wherein each of the first and second load paths links the first trailing arm to the second trailing arm, and
   wherein the first balancer system is connected to each of the first and second trailing arms at a different location than the second balancer system such that the first load path is separate and distinct from the second load path.

17. The rear suspension of claim 16, wherein the first balancer system comprises a first balancer control arm extending in a transverse direction between and connected to each of the first and second trailing arms, a first hinged control arm connected to the first balancer control arm, and an actuator attached to the first hinged control arm.

18. The rear suspension of claim 16, wherein the second balancer system comprises a second balancer control arm extending in a transverse direction between and connected to each of the first and second trailing arms and at least one spring/damper element.

19. The suspension of claim 16, wherein the second balancer system comprises two link arms and a lateral spring/damper element operating between the two link arms.

20. The rear suspension of claim 16, wherein the second balancer control system comprises a leaf spring.

21. The rear suspension of claim 16, wherein each of the first and second trailing arms has about a 90 degree angle.

22. The rear suspension of claim 16, wherein the first balancer system comprises a first balancer control arm and the second balancer system comprises a second balancer control arm, the first and second balancer control arms extending adjacent to one another in parallel between and transverse to the first and second trailing arms.

23. The rear suspension of claim 22, wherein the first balancer system comprises a vertical connecting rod at each end of the first balancer control arm, the vertical connecting rods connecting the first balancer system to the first and second trailing arms.

24. A method of stabilizing a tiltable, multitrack vehicle comprising a first rear wheel mounted to a first rear trailing arm and a second rear wheel mounted to a second rear trailing arm, the method comprising:
   distributing a first load via a first balancer system during a roll motion of the vehicle to influence a leaning angle of the vehicle, the first balancer system being connected to each of the first rear trailing arm and the second rear trailing arm; and
   distributing a second load via a second balancer system during a jounce/rebound motion of the vehicle to suppresses a resonant vertical motion of the vehicle, the second balancer system being connected to each of the first rear trailing arm and the second rear trailing arm at a different location than the first balancer system such that a load path of the first balancer system, which links the rear trailing arms, is separate and distinct from a load path of the second balancer system, which links the rear trailing arms.

25. A rear suspension for a laterally tiltable, multitrack vehicle, comprising:
   first and second balancer systems, the first balancer system comprising a first balancer control arm and the second balancer system comprising a second balancer control arm, the first and second balancer controls arms extending adjacent to one another in parallel transversely between and independently connected to each of first and second trailing arms,
   the first balancer system being configured to create a torque along a first load path to influence a leaning angle of the vehicle, and
   the second balancer system being configured to suppress a resonant vertical motion of the vehicle along a second, independent load path.

* * * * *